(12) United States Patent
Lim et al.

(10) Patent No.: US 7,292,551 B2
(45) Date of Patent: Nov. 6, 2007

(54) CELL SEARCH METHOD IN DISCONTINUOUS RECEPTION MODE IN A MOBILE COMMUNICATION SYSTEM

(76) Inventors: Chae-Man Lim, 765, Kuro-dong, Kuro-gu, Seoul (KR); Joo-Kwang Kim, #103-1107, Daewoo APT., Sangha-ri, Kusong-myeon, Yongin-shi, Kyonggi-do (KR); Seong-Ho Hur, 57-4, Jongja-dong, Pundang-gu, Songnam-shi, Kyonggi-do (KR); Dong-Ryeol Ryu, #3-1106, Kyongnam APT., Chunggye 2-dong, Nowon-gu, Seoul (KR); Kwang-Man Ok, 109-12, Sunae-dong, Pundang-gu, Songnam-shi, Kyonggi-do (KR)

( * ) Notice: Subject to any disclaimer, the term of this patent is extended or adjusted under 35 U.S.C. 154(b) by 959 days.

(21) Appl. No.: 10/268,502

(22) Filed: Oct. 10, 2002

(65) Prior Publication Data
US 2003/0117996 A1 Jun. 26, 2003

(30) Foreign Application Priority Data
Oct. 10, 2001 (KR) .................. 10-2001-0062455

(51) Int. Cl.
*H04Q 7/00* (2006.01)
(52) U.S. Cl. .................. 370/332; 370/252; 455/437; 455/442

(58) Field of Classification Search ............. 355/127.1; 370/310.2, 311, 350, 342, 335, 441, 503, 370/330–332, 328, 535, 252; 340/7.32–7.38; 375/142, 150, 130, 140, 141, 147, 152, 343; 455/436–439, 442
See application file for complete search history.

(56) References Cited

U.S. PATENT DOCUMENTS 5,499,386 A    3/1996  Karlsson ................ 455/33.2
5,577,022 A *  11/1996 Padovani et al. .......... 370/332

(Continued)

FOREIGN PATENT DOCUMENTS

EP          0 967 818        12/1999

(Continued)

OTHER PUBLICATIONS

European Search Report dated Jun. 6, 2003 issued in a counterpart application, namely Appl. No. 02022928.2.

*Primary Examiner*—John Pezzlo
(74) *Attorney, Agent, or Firm*—The Farrell Law Firm, P.C.

(57) ABSTRACT

A method of increasing the waiting time of a mobile terminal by reducing power consumption for a cell search in a discontinuous reception mode. In an embodiment of the invention, the strengths of signals from neighbor cells are measured and compared with a first threshold. Then a cell search is performed on only neighbor cells having signal strengths higher than the first threshold. In a second embodiment of the invention, a cell search is not performed if the signal strength of an active set is higher than a second threshold in a discontinuous reception mode. In a third embodiment of the invention, an offline cell search is performed in a discontinuous reception mode in the last step of three conventional cell search steps.

13 Claims, 5 Drawing Sheets

U.S. PATENT DOCUMENTS

| | | | |
|---|---|---|---|
| 6,278,703 B1 * | 8/2001 | Neufeld | 370/342 |
| 6,480,558 B1 * | 11/2002 | Ottosson et al. | 375/350 |
| 6,577,608 B1 * | 6/2003 | Moon et al. | 370/311 |
| 6,650,690 B2 * | 11/2003 | Becker et al. | 375/142 |
| 6,845,238 B1 * | 1/2005 | Muller | 455/436 |
| 6,888,879 B1 * | 5/2005 | Lennen | 375/149 |
| 7,110,765 B2 * | 9/2006 | Amerga et al. | 455/436 |
| 2001/0026542 A1 * | 10/2001 | Kusaka et al. | 370/331 |
| 2002/0187784 A1 * | 12/2002 | Tigerstedt et al. | 455/439 |

FOREIGN PATENT DOCUMENTS

| | | |
|---|---|---|
| JP | 10-126830 | 5/1998 |
| JP | 2001-069063 | 3/2001 |
| WO | WO99/62285 | 12/1999 |
| WO | WO 00/10336 | 2/2000 |

\* cited by examiner

CELL SEARCH METHOD IN DISCONTINUOUS RECEPTION MODE IN A MOBILE COMMUNICATION SYSTEM

PRIORITY

This application claims priority to an application entitled "Cell Search Method in Discontinuous Reception Mode in a Mobile Communication System" filed in the Korean Industrial Property Office on Oct. 10, 2001 and assigned Ser. No. 2001-62455, the contents of which are hereby incorporated by reference.

BACKGROUND OF THE INVENTION

1. Field of the Invention

The present invention relates generally to a cell search method in a mobile communication system, and in particular, to a cell search method in a discontinuous reception mode in order to reduce power consumption in a mobile terminal.

2. Description of the Related Art

In general, mobility and portability are main characteristics of a mobile terminal. To ensure the mobility and portability, a battery is used as a power source for the mobile terminal. Waiting time is a period of time where components are in a low power consumption mode. Studies have been conducted to increase the waiting time in the mobile terminal.

Most of power consumption in a mobile terminal occurs due to sleep current, digital components, and radio frequency (RF) components in the mobile terminal. In order to increase the waiting time, power consumption in each element must be minimized. Sleep current refers to power consumption in a non-message reception period. Power consumption due to the sleep current is usually observed in an RF oscillator, an LCD (Liquid Crystal Display), a microprocessor, and power supplies. The RF oscillator experiences the highest sleep current power consumption. Therefore, power consumption in an RF oscillator must be reduced. To do so, it is necessary to reduce the time required to turn on an RF module.

A UMTS (Universal Mobile Telecommunication System) mobile terminal turns on an RF module periodically to check whether it has been paged. Specifically, the UMTS mobile terminal turns on a receiver periodically to monitor a PICH (Paging Indication Channel), detects a PI (Paging Indicator) from the PICH, and demodulates a PCH (Paging Channel) if PI=1 or PI=eraser. At the same time, the mobile terminal searches cells to determine whether there is a Node B having a higher signal strength than the current active set Node B. The cell search is usually performed in three steps, that is, slot timing synchronization, frame grouping, and a cell search.

According to the UMTS specification, a sliding PICH is used for a cell search. This is a method of buffering data while varying the turn-on time of the receiver and searching cells based on the buffered data.

However, the sliding PICH cell search method is not feasible in reality because a long time is required to collect frames of information needed for a cell search and the movement of the mobile terminal may change a radio environment during the time period.

SUMMARY OF THE INVENTION

It is, therefore, an object of the present invention to provide an offline cell search method that increases the waiting time of a mobile terminal in a discontinuous reception mode in a mobile communication system that transmits a neighbor list.

It is another object of the present invention to provide a method of searching cells in a discontinuous reception mode only when the reception strength of an active set Node B is equal to or less than a threshold in order to increase the waiting time of a mobile terminal in a mobile communication system.

It is a further object of the present invention to provide a method of performing a cell search only on neighbor cells having signal strengths greater than a threshold in a discontinuous reception mode in order to increase the waiting time of a mobile terminal in a mobile communication system.

To achieve the above and other objects, there is provided a cell search method in a discontinuous reception mode in a mobile terminal that receives a neighbor list from a Node B. The mobile terminal performs slot timing synchronization by supplying power to a receiver, buffers data received from neighbor Nodes B included in the neighbor list, turns off an RF module, and performs an offline cell search using the buffered data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Three embodiments are provided to reduce power consumption during a cell search in a discontinuous reception mode in a mobile communication system and thus to increase the waiting time of a mobile terminal. One of them is a three-step offline cell search in the last step of the conventional cell search process. Another is to search all of the neighbor cells periodically, select neighbor cells to which a handover is probable to occur, and periodically monitor the selected neighbor cells. The other is not to perform a cell search when the energy of the current active set Node B is equal to or greater than a threshold. The embodiments can be implemented individually or in combination.

Figure 1:
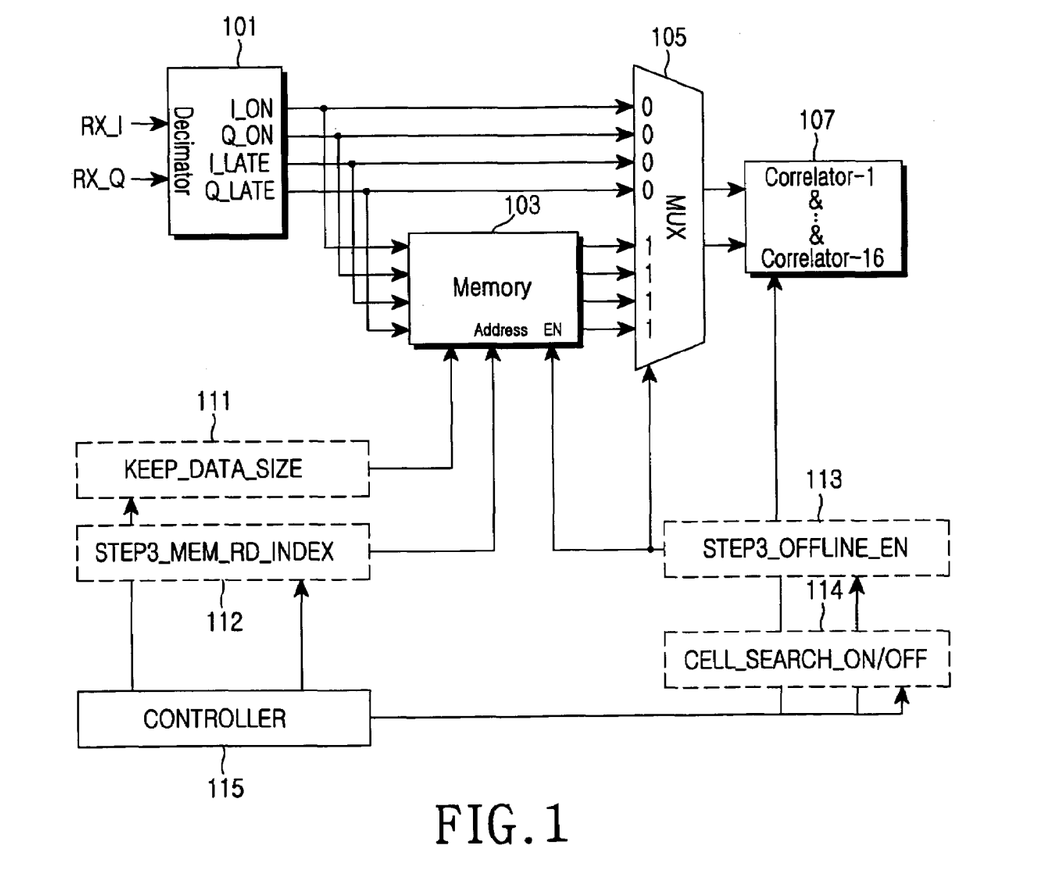
FIG. 1 is a block diagram of a receiver for performing an offline cell search according to an embodiment of the present invention.
Figure 2:
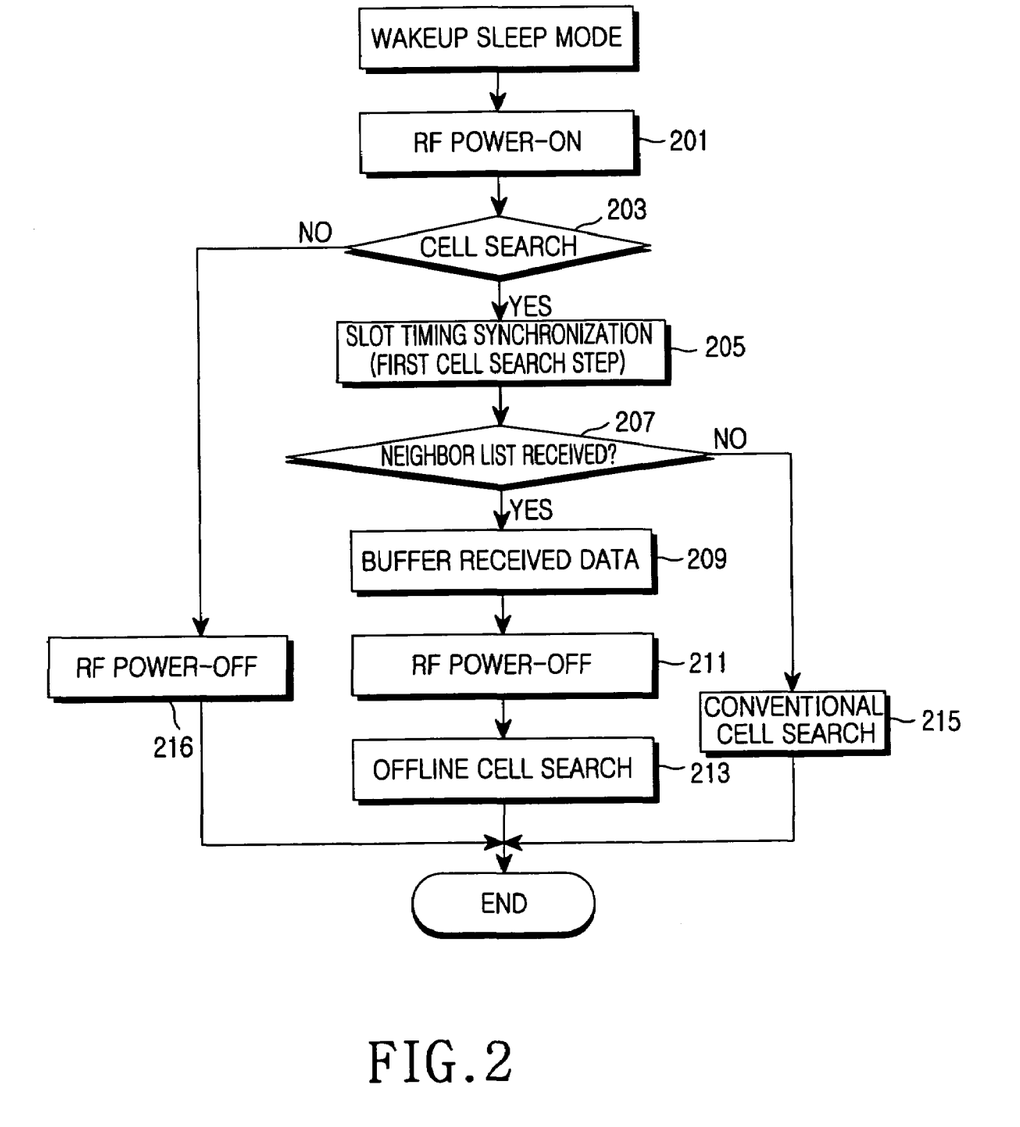
FIG. 2 is a flowchart illustrating a cell search method in a discontinuous reception mode in a mobile communication system according to the embodiment of the present invention.

Referring to FIGS. 1 and 2, the first embodiment of the present invention will be described. FIG. 1 is a block diagram of a receiver for performing a cell search in a mobile communication system and FIG. 2 is a flowchart illustrating a cell search according to the first embodiment of the present invention.

Referring to FIG. 1, a decimator 101 receives an I (In-Phase) signal Rx_I and a Q (Quadrature-Phase) signal Rx_Q and outputs I on-time data I_On, Q on-time data Q_On, I late-time data I_Late, and Q late-time data Q_Late. A memory 103 receives the data from the decimator 101 and operates according to an offline enable signal STEP3_OFFLINE_EN 113 received from a higher layer. If the offline enable signal STEP3_OFFLINE_EN 113 is set to enable, the memory 103 receives a buffering indication signal KEEP_DATA_SIZE 111 indicating the amount of data to be buffered from the higher layer and buffers as much data received from the decimator 101 as indicated. The size of the buffered data is calculated by adding one slot duration (2560) to an accumulation period Nc and multiplying the addition result by 2 samples per chip. Then the memory 103 receives a data read signal STEP3_MEM_RD_INDEX 112 from the higher layer and reads data at a position as indicated by the data read signal. A multiplexer (MUX) 105 selects the data received from the decimator 101 or the data received from the memory 103 according to the offline enable signal STEP3_OFFLINE_EN 113. If the offline enable signal STEP3_OFFLINE_EN 113 is set to disable, the MUX 105 selects the data received from the decimator 101, and if the offline enable signal STEP3_OFFLINE_EN 113 is set to enable, it selects the data received from the memory 103. The output of the MUX 105 is applied to the input of a correlator unit 107. The controller 115 gives buffering indication signal KEEP_DATA_SIZE 111 to memory, data read signal STEP3_MEM_RD_INDEX determined by a index of a $1^{st}$ correlation value to memory, offline enable signal STEP3_OFFLINE_EN 113 to the multiplexer (MUX) 105 and memory 103. Also controller 115 determines cell searching on/off and gives cell searching off signal CELL_SEARCH_ON/OFF 114 to the correlator 107. The correlator unit 107 includes a plurality of correlators, 16 correlators in FIG. 1. In this case, a cell search can be performed on up to 16 at least one Node B simultaneously. Each correlator measures a correlation between an internally generated scrambling code and the input data on a chip basis. When the offline enable signal is set to enable, this implies that the third cell search step is performed in an offline mode. The data buffering may be performed in the first cell search step.

The mobile terminal wakes up from sleep at various occasions, for example, when an RF module is periodically turned on for PI monitoring or when other interrupts are generated. If it is paged, the mobile terminal receives a paging message and searches cells simultaneously in some cases.

Referring to FIG. 2, after the mobile terminal wakes up from sleep, it supplies power to an RF module in step 201. Here, it is to be noted that the following description is confined to only a cell search. The mobile terminal determines whether a cell search is to be performed in step 203. The cell search is periodically performed using an internal timer (not shown). If no cell search is to be performed, RF Power is turned off in step 216 and the process ends. If a cell search is to be performed, the mobile terminal performs the first cell search step, that is, slot timing synchronization in step 205. In the first cell search step, N peak values higher than a predetermined value are obtained in a correlation operation. In step 207, the mobile terminal determines whether a neighbor list has been received from a serving Node B. Upon receipt of the neighbor list, the mobile terminal provides a buffering indication signal to the memory 103 of FIG. 1 and the memory 103 buffers data received from N Node B in the neighbor list in step 209. The mobile terminal turns off the RF module in step 211 and performs an offline cell search in step 213. On the other hand, if the neighbor list is not received in step 207, the mobile terminal performs the conventional online cell search in step 215.

Figure 3:
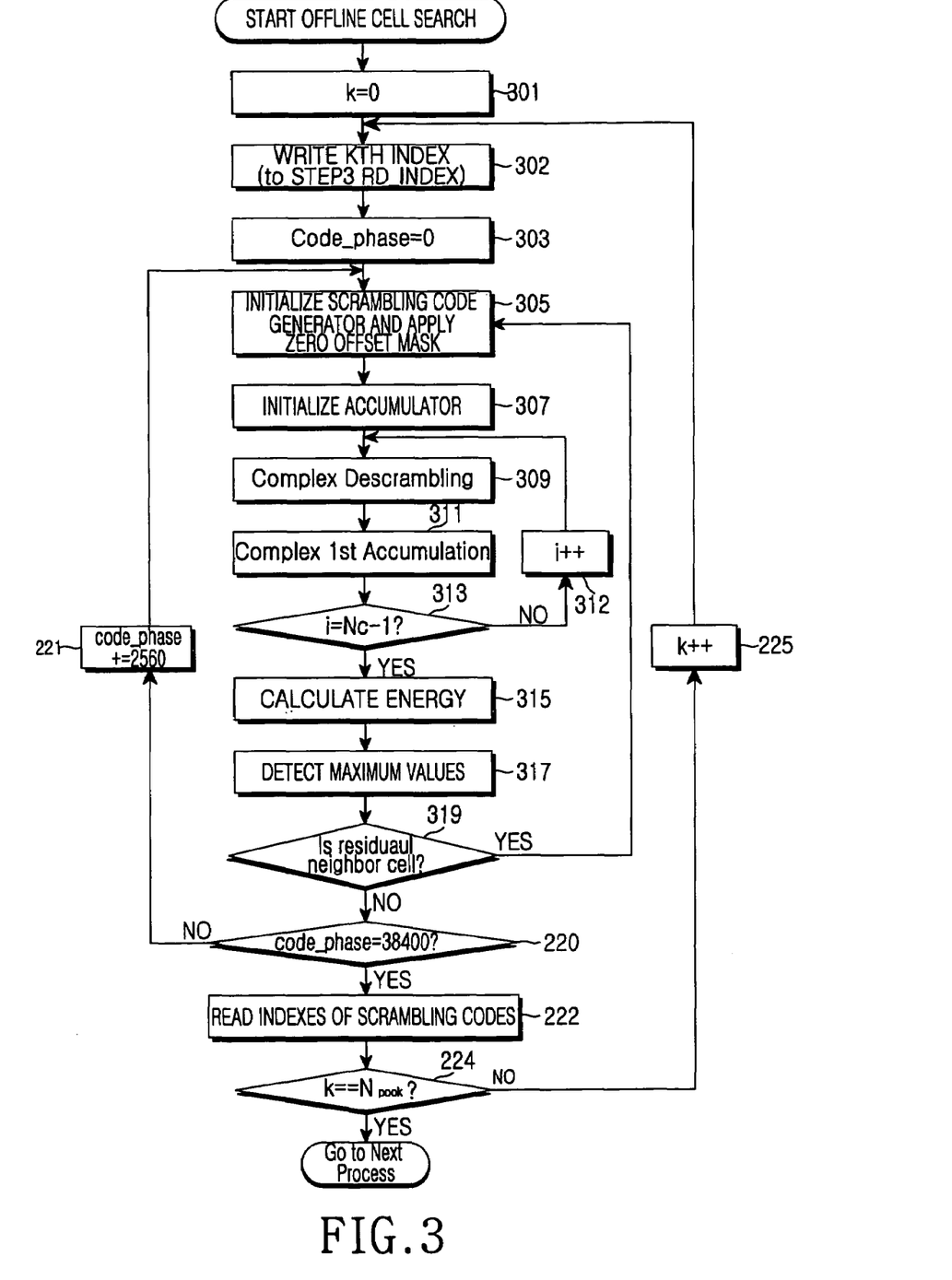
FIG. 3 is a detailed flowchart illustrating an offline cell search depicted in FIG. 2.

FIG. 3 is a flowchart illustrating a three-step offline cell search in a discontinuous reception mode according to the embodiment of the present invention. The offline cell search is performed only if the neighbor list is received.

Steps 301 to 307 pertain to initialization for cell search. The mobile terminal sets a variable K indicating the number of peaks equal to or greater than a threshold achieved in the first cell search step to 0 in step 301 and designates a position in the memory 103 for correlating a kth peak in step 302. The index of the kth peak is written in a register 112 in FIG. 1. In step 303, the phase of a scrambling code is set to an initial value 0. The mobile terminal initializes scrambling code generators (not shown) for the correlators and applies a zero offset mask in step 305. The zero offset mask matches the time of generating scrambling codes to a $0^{th}$ slot boundary. In step 307, a variable i indicating a data accumulation value is set to an initial value 0 and an accumulator is initialized. Then, the mobile terminal complex-despreads a first peak among the N peaks obtained from the first cell search step of FIG. 2 on a chip-by-chip basis, correlates the first peak in step 309 and accumulates the correlation result in step 311. In step 313, the variable i is compared with the predetermined accumulation period Nc to determine whether the first peak has been correlated for the accumulation period Nc. If the correlation is not completed for the accumulation period, the variable i is increased by 1 in step 312 and the procedure returns to step 309. That is, steps 309 and 311 are repeated until the correlation is completed for the accumulation period Nc. Upon completion of the correlation for the accumulation period Nc, the mobile terminal calculates the energy of the accumulated data in step 315 and detects the highest correlation values by comparing successively received correlation values of the neighbor cells in step 317. The number of the highest correlation values is not limited but is 3 here. In step 319, the mobile terminal checks whether there remain neighbor cells to be searched in the neighbor list. If neighbor cells remain, steps 305 to 317 are repeated for the remaining neighbor cells. If it is determined that the energy of all neighbor cells has been calculated in step 319, the mobile terminal checks whether the scrambling code phase is 38400 chips in step 220 to determine whether the above steps have been performed for a frame. If the frame is yet to be processed, the mobile terminal increases the code phase by one slot, that is, 2560 chips in step 221 and then repeats steps 305 to 319. When the energy of the frame is calculated for all the neighbor cells, the mobile terminal reads the energy and phase indexes of the three scrambling codes corresponding to the three highest energy levels in step 222. The indexes of the scrambling codes are listed in the neighbor list. In step 224, the mobile terminal performs the three-step cell search for all the peaks obtained in the first cell search step of FIG. 2.

Figure 4:
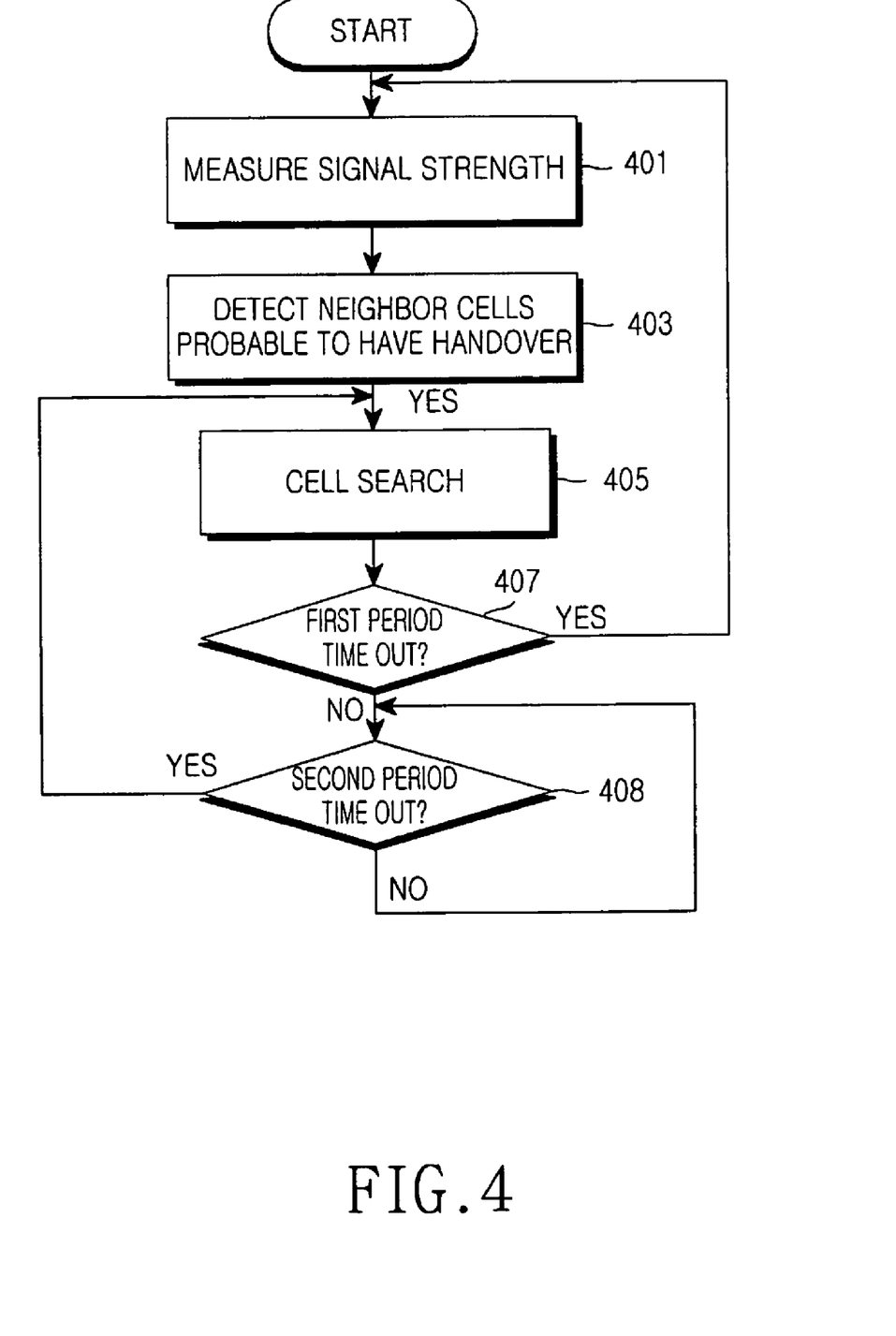
FIG. 4 is a flowchart illustrating a cell search method in a discontinuous reception mode in a mobile communication system according to another embodiment of the present invention.

FIG. 4 is a flowchart illustrating a cell search method in a discontinuous reception mode in a mobile communication system according to another embodiment of the present invention.

Referring to FIG. 4, the mobile terminal measures the signal strengths of neighbor cells in step 401 and searches for neighbor cells to which a handover may occur in step 403. The neighbor cells to which a handover can occur can be determined by checking if the signal strengths are greater than a threshold. If such neighbor cells are detected, the mobile terminal determines whether a first predetermined time period has expired in step 407. If it has, the mobile terminal returns to step 401 and otherwise, the mobile terminal determines whether a second predetermined time period has expired in step 409. If the second predetermined time period has expired, the mobile terminal returns to step 405. The first time period is longer than the second time period. That is, if a cell search is repeated for the neighbor cells to which a handover can occur for the first time period and then the second time period elapses, it is determined that the neighbor cells probable to have a handover have been changed by measuring the signal strengths of all the neighbor cells.

Figure 5:
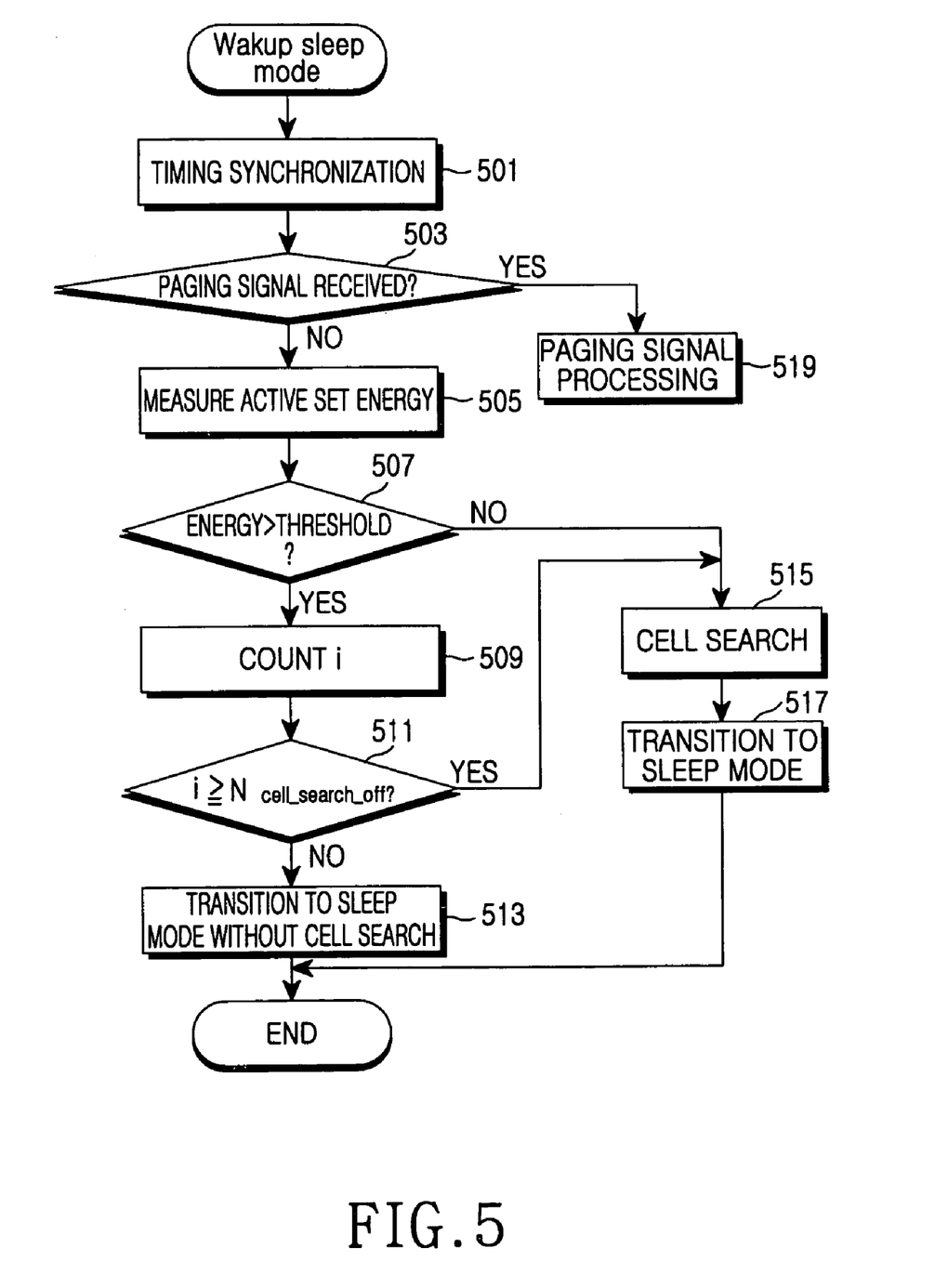
FIG. 5 is a flowchart illustrating a cell search method in a discontinuous reception mode in a mobile communication system according to a third embodiment of the present invention.

FIG. 5 is a flowchart illustrating a cell search method according to a third embodiment of the present invention. Referring to FIG. 5, the mobile terminal acquires timing different from the timing of the active set in step 501 after it wakes up from sleep. In step 503, the mobile terminal determines whether a paging signal has been received. Upon receipt of the paging signal, the mobile terminal processes the paging signal in step 519. If the paging signal has not been received, the mobile terminal measures the energy of the active set in step 505 and compares the energy with a threshold in step 507. If the energy exceeds the threshold, the mobile terminal counts the number of cells i that have not been searched in step 509. If the energy is equal to or less than the threshold, the mobile terminal performs a cell search in step 515. After step 509, the mobile terminal compares the variable i with the number of cells that are not supposed to be searched, Ncell_search_off in step 511. If i is less than Ncell_search_off, the mobile terminal transitions to a sleep mode without a cell search in step 513. If i is equal to or greater than Ncell_search_off, the mobile terminal performs a cell search in step 515 and then transitions to the sleep mode in step 517.

In accordance with the present invention as described above, the three-step cell search is performed offline, a cell search is performed only on cells to which a handover may occur, and a cell search is not performed when the energy of an active set is high enough. Therefore, power is saved in an RF module and the waiting time of a mobile terminal is increased.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for controlling cell searching, comprising;
   a memory for buffering received data from a decimator;
   a multiplexer for selecting on/off-line cell searching;
   a correlator for performing cell searching; and
   a controller for outputting a predetermined buffering data size information to the memory, outputting an address information for reading data from the memory, outputting a signal for controlling the multiplexer and outputting a signal for selecting enable/disable cell searching to the correlator.

2. A cell search method in a mobile station that receives a neighbor list, comprising the steps of:
   determining an off-line cell search;
   buffering received data from a decimator into a memory;
   turning off an RF (Radio Frequency) module; and
   reading the data determined by a memory address from an index of a $1^{st}$ correlation value; and
   performing the off-line cell search using the read data.

3. The cell search method of claim 2, wherein in the determining an off-line cell search step, a multiplexer selects the off-line cell search and a memory enables simultaneously.

4. A cell search method in a mobile station that receives a neighbor cell list, comprising the steps of:
   determining at least one searchable cell if a neighbor cell having signal strengths greater than a threshold, said threshold indicating handover probable cell having signal strength;
   searching the determined searchable cell for a first predetermined time; and
   updating the searchable cell after a second predetermined time.

5. A cell search method in a mobile station, comprising the steps of: steps of:
   counting a number if a cell of active set having signal strengths greater than a threshold indicating predetermined cell coverage having signal strength; and
   performing cell searching if the number is greater than or equal to a predetermined Ncell_search_off.

6. A cell search method in a mobile terminal that operates in a discontinuous reception mode and receives a neighbor list from a Node B, comprising the steps of:
   turning on an RF (Radio Frequency) module;
   performing slot timing synchronization;
   buffering data received from at least one neighbor Node B included in the neighbor list;
   turning off the RF module; and
   performing an offline cell search using the buffered data.

7. A cell search method in a mobile terminal that receives a neighbor list from a Node B, comprising the steps of:
   measuring the strengths of signals received from at least one neighbor Node B included in the neighbor list;
   determining neighbor cells having signal strengths greater than a threshold, said threshold indicating handover probability; and
   performing a cell search on the determined neighbor cells for a first predeterminated time period.

8. The cell search method of claim 7, wherein the cell search on the determined neighbor cells is performed for a second predetermined time period.

9. The cell search method of claim 8, wherein the first predetermined time period is longer than the second predetermined time period.

10. A cell search method in a mobile terminal that receives a neighbor list from a Node B, comprising the steps of:
    measuring energy levels of an active set of a plurality of Node B in the neighbor list when the mobile terminal wakes up from sleep;
    comparing the energy levels with a threshold;
    omitting a cell search of a particular Node B if the energy level of the particular Node B is greater than the threshold; and performing a cell search on a plurality of Node B if the energy level of the plurality of Node B is less than the threshold and transitioning to a sleep mode.

11. The cell search method of claim 10, further comprising the step of performing a cell search if a number of occurrences of omitting the cell search and transitioning to the sleep mode is equal to or greater than a predetermined value.

12. The cell search method of claim 10, further comprising the step of performing a cell search if energy is equal to or less than the threshold.

13. A cell search method in a mobile terminal that receives a neighbor list from a Node B, comprising the steps of:
measuring energy of neighbor at least one Node B in the neighbor list;
determining if neighbor cells have signal strengths greater than a threshold, said threshold indicating handover probability; and
performing an offline cell search on the determined neighbor cells.

* * * * *